Nov. 2, 1948.    M. N. FAIRBANK    2,453,005
MOLD FOR FORMING PORRO PRISMS

Filed Dec. 31, 1943    2 Sheets-Sheet 1

INVENTOR.
Murry N. Fairbank
BY
Donald L. Brown
Attorney

Nov. 2, 1948.                M. N. FAIRBANK                2,453,005
                        MOLD FOR FORMING PORRO PRISMS
Filed Dec. 31, 1943                                    2 Sheets-Sheet 2

INVENTOR.
Murry N. Fairbank
BY Donald L. Brown
   Attorney

Patented Nov. 2, 1948

2,453,005

UNITED STATES PATENT OFFICE 2,453,005

MOLD FOR FORMING PORRO PRISMS

Murry N. Fairbank, Weston, Mass., assignor to Polaroid Corporation, Cambridge, Mass., a corporation of Delaware Application December 31, 1943, Serial No. 516,416

5 Claims. (Cl. 18—39)

This invention relates to optical elements, such as prisms, and more particularly to mold means for forming prisms.

Complex prisms whereby a beam of light may be inverted and reversed left and right are well known in the optical art and have usually consisted of a plurality of separately mounted prisms. Porro prisms, for example, in their conventional form, consist of a pair of separate isosceles rightangle prisms so arranged that a beam of light entering the hypothenuse face of one is totally reflected twice before emerging from the same face and entering the second prism at its hypothenuse face, the double reflection being repeated within the second prism. Heretofore said prisms have been formed of glass and their formation has involved accurate grinding of the several light-transmitting and light-reflecting surfaces and accurate precision mounting of the separate prisms in relation to each other.

It is, accordingly, one object of the present invention to provide novel molding apparatus for casting a unitary prism means of the type adapted to invert and reverse a beam of light whereby the desired shape, smoothness, and surface accuracy are imparted to said prism means in a single casting operation, thereby obviating expensive grinding operations and assembling devices.

Another object is to provide novel apparatus of the above character for molding unitary prism means of the Porro type, said apparatus comprising a novel arrangement of molding members whereby a single plate provides the molding surfaces for forming the parallel hypothenuse faces of said prism means.

In the drawings, wherein like numerals refer to like parts throughout the several views.

Figure 1:
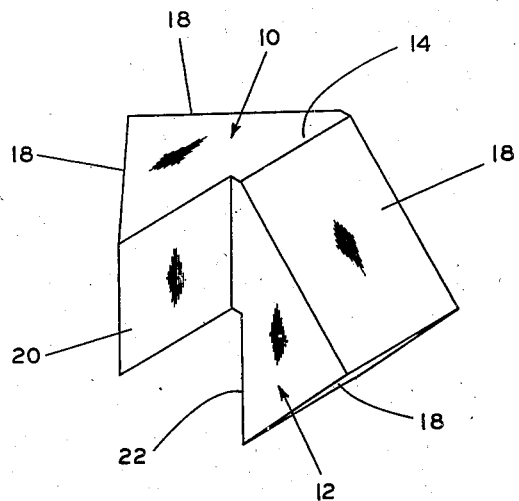
Figure 1 is a perspective view of a Porro prism means formed in accordance with the present invention.

Referring to Fig. 1, there is shown novel prism means of the Porro type embodying the present invention and, as shown, said prism means comprise a pair of triangular right-angle isosceles prisms 10 and 12, integrally connected at their overlapping hypothenuse faces by a rectangular parallelepiped portion 14. Prisms 10 and 12 are angularly disposed relative to each other in the same manner as the isosceles right-angle prisms of a conventional Porro prism pair, with isosceles sides 18 of said prisms being thereby angularly disposed relative to each other in the same way as the isosceles sides of a conventional Porro prism. Accordingly, an image viewed through either of parallel hypothenuse surfaces 20 and 22 of said prisms is inverted and reversed right and left.

Prism 10, 12 is formed of a material which may be cast to the desired shape and which may have optically smooth surfaces imparted thereto directly during the formation thereof without subsequent polishing or other surfacing operations. Preferred materials for the prism are organic resins which are sufficiently transparent, homogeneous and hard, to be used optically, and which may be accurately cast by polymerization in molds, and examples of resins of this character are cyclohexyl methacrylate, styrene, methyl methacrylate, benzyl methacrylate, and orthochlorostyrene. It has been determined that the vinyl compounds, such as styrene, orthochlorostyrene and other members of the styrene family, and esters of acrylic and alpha-substituted acrylic acids, and particularly methacrylic acid, and copolymers and interpolymers thereof, provide polymerizable materials best suited for forming the novel prism means of the invention. It is to be expressly understood, however, that all materials are contemplated which may be readily hardened in a mold and which, when hardened, have physical properties adapting them for utility for optical purposes.

Figure 2:
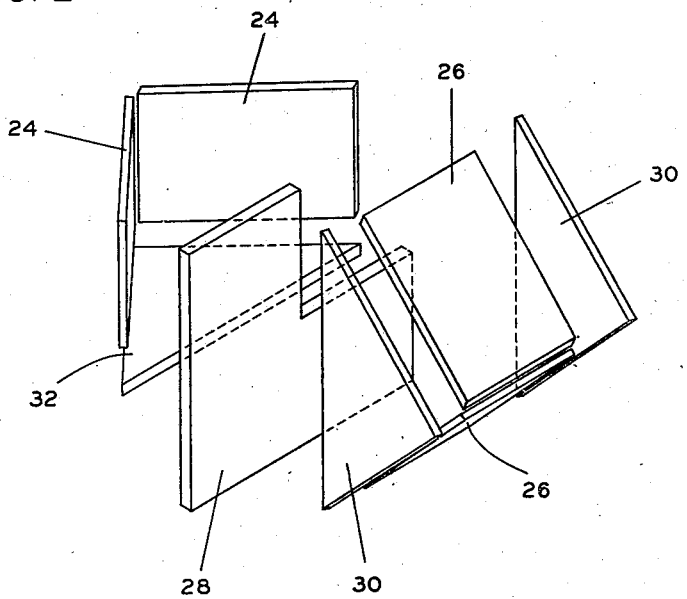
Fig. 2 is an exploded perspective view of a mold apparatus for forming the prisms means of Fig. 1.

Prism means 10, 12 is preferably cast in a mold, the latter being constructed in a novel manner so as to impart during the casting a high degree of smoothness and accuracy to the light-transmitting and reflecting surfaces of said prism means and a high degree of parallelism to the hypothenuse faces 20 and 22 thereof. In the form illustrated, the mold is formed from a plurality of plates 24, 26, 28, 30 and 32 (Fig. 2), for example of glass, and each of plates 24, 26 and 28, which are adapted to define the light-transmitting and light-reflecting surfaces of prism means 10, 12, is optically smooth, being polished to the same degree of optical smoothness which it is desired to impart to the corresponding face of the prism means.

The inner faces of plates 24 are adapted to define isosceles sides 18 of one of prisms 10, 12, for example prism 10, and the inner faces of plates 26 are adapted to define isosceles sides 18 of the other of said prisms, i. e., prism 12. Plate 28 is adapted to define both hypothenuse surfaces 20 and 22 of the prism, the surface of the upper left-hand portion of plate 28, as viewed in Fig. 2 opposite plates 24, being adapted to define hypothenuse face 20 and the surface of the lower right-hand portion of said plate 28 opposite plates 26 being adapted to define hypothenuse face 22. The upper right-hand portion of said plate 28 is cut away and provides the mold cavity for forming portion 14 which integrally connects prisms 10 and 12. It is to be noted that by means of this novel construction of the mold and the prism means whereby a single plate defines both hypothenuse surfaces of prisms 10 and 12, a high degree of parallelism between said surfaces is obtained.

Plates 24, 26 and 28 are accurately assembled in operative relation to each other, as more fully described hereinafter, and are then rigidly secured together by suitable cementing means. A suitable cement is an alloy of the type having a melting point above the highest temperature to be used in casting the prism and having as nearly as possible a zero coefficient of thermal expansion at its hardening temperature. An example of this type of alloy, which may be used when cyclohexyl methacrylate and styrene are the polymerizable resins from which the prism is cast, is the material sold commercially as Belmont Brand No. 255 Low Melting Alloy Solder, which is an alloy of bismuth and lead in the proportions of substantially five parts of bismuth to four parts of lead. It is also possible to use soluble cements, such as mixtures of sodium silicate with suitable fillers, as for example wood flour, pumice, or the like, and the refractory water-soluble cement sold under the trade name "Insalute."

After plates 24, 26 and 28 are operatively assembled and cemented together, each of plates 30 is secured in fluid-tight engagement, as by being cemented, to the edges of plates 26 to form the mold cavity for casting prism 12. Plate 32 is similarly secured, as shown, to the edges of plates 24.

When plates 24, 26, 28, 30 and 32 are thus operatively secured together, the moldable mass is poured through the open face at the upper edges of plates 24 to fill the mold cavity. The moldable mass may be a monomer, a partial polymer obtained by partially polymerizing the monomer or by dissolving a predetermined quantity of polymer in the monomer, or a mixture of monomers or partial polymers adapted to polymerize into copolymers or interpolymers. The polymerizable mass may be hardened in the mold by being subjected to heat and/or chemical catalysis and/or actinic light, in accordance with any polymerization cycle adapted to produce a homogeneous mass and adapted to cause said mass to conform to the shape and surface smoothness of the molding surfaces of the mold in which the polymerization is carried out.

One method of forming the prism in the mold comprises partially polymerizing a monomer of a linearly polymerizable compound, such as styrene or cyclohexyl methacrylate, until the partial polymer is only sufficiently non-viscous to be poured or otherwise introduced into the mold. The mold is filled with the partial polymer and the polymerization is then completed, preferably by applying heat and without the application of pressure. The polymerizable composition introduced into the mold preferably contains a small quantity of a polymerization catalyst, such as benzoyl peroxide, and said composition may also contain a surface-active compound, such as stearic acid or another long-chain fatty acid, for facilitating separation of the molded product from the mold walls and preventing imperfections in the surfaces of the molded product. Best results are obtained by carrying out the casting in the mold in two steps, the mass being first polymerized at a predetermined temperature substantially below the softening point of the polymer, until hardened. Then the polymerization of the mass is completed at a relatively higher temperature but one which is still below the softening point of the polymer. After the polymerization is complete, the cement securing together the mold walls is removed and the mold walls are separated from the molded product in any suitable manner, as by immersing the unit comprising the mold walls and the prism in a water bath containing a detergent, said bath being maintained at substantially the same temperature as the temperature at which the last bake is carried out. Care is taken to remove the cement under conditions which will not appreciably cool the mold walls or the prism formed within said walls.

Figure 3:
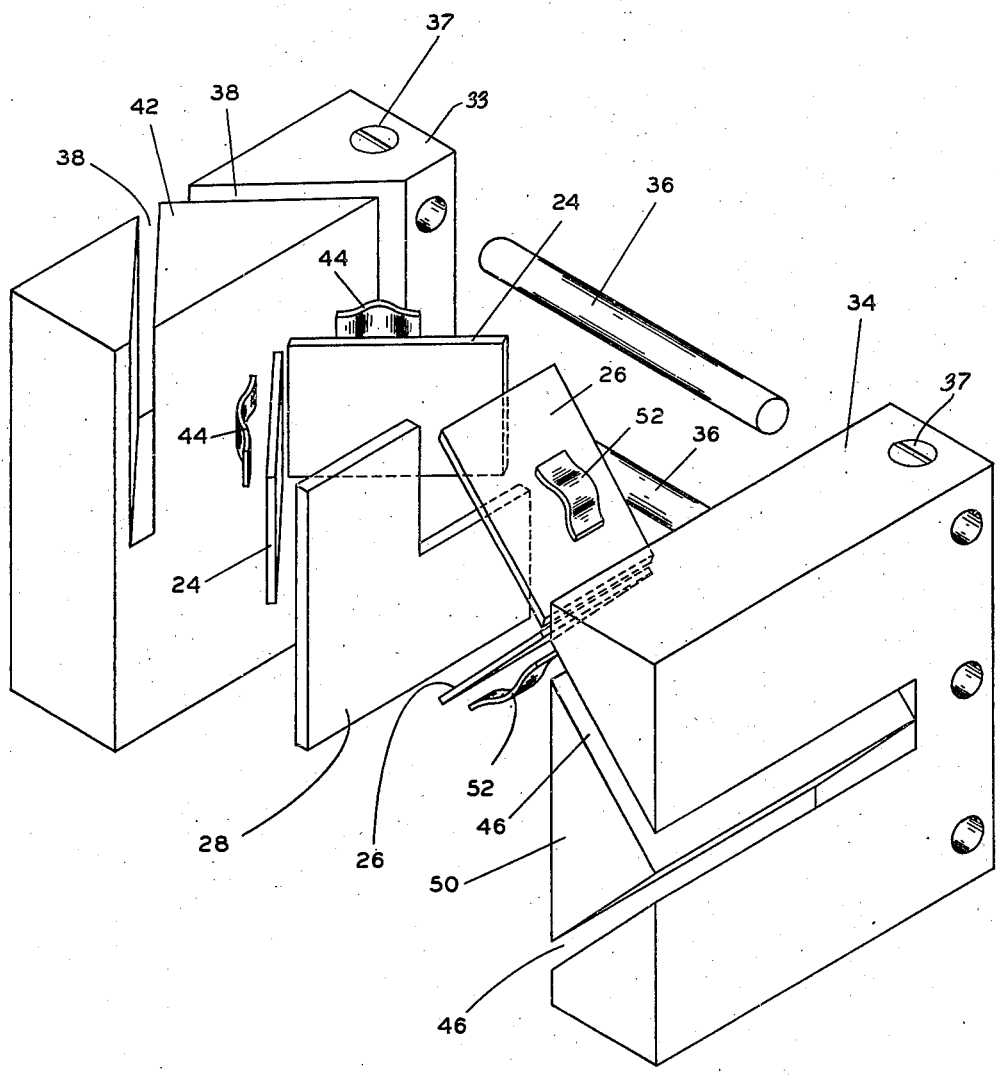
Fig. 3 is an exploded perspective view of apparatus for assembling and securing together the elements of the mold of Fig. 2.

Novel means are provided for operatively assembling mold plates 24, 26 and 28 and for retaining said plates in accurate assembly while the same are rigidly secured together. As shown in Fig. 3, said assembling means comprises a pair of retaining members or jigs 33 and 34, adapted to be secured together by suitable means, such as pins 36, the latter being held, for example, by set screws 37 which, as shown in Fig. 3, are inserted in threaded holes extending from the top of each block and intersecting the holes in which the ends of the top positioning rod 26 are inserted. A pair of angularly disposed slots 38 are provided in jig 33 for the purpose of forming an integral prismatic plate-locating fixture or block 42 in said jig. The side walls of said block are accurately surfaced and are accurately disposed relative to each other at the same angle as the side walls of prism 10. The surface of jig 33 which is adjacent jig 34 is accurately formed so that the base of block 42, which is coplanar with said surface, bears the same relation to the side walls of said block as the hypothenuse of prism 10 bears to the side walls of said prism. Each of slots 38 is adapted to receive one of plates 24 and said plates are biased into contact with the side faces of fixture 42 by suitable resilient means, such as leaf springs 44. Jig 34 is similarly provided with a pair of angularly disposed slots 46 which form a plate-locating, prismatic fixture or block 50 of the same shape as prism 12, said block being disposed at substantially 90 degrees to block 42 of jig 33 when jigs 33 and 34 are operatively assembled. Slots 46 are adapted to receive plates 26 and the latter are pressed into engagement with the walls of fixture 50, as by springs 52. In operation, jigs 33 and 34 are mounted with plates 24 and 26 suitably positioned in slots 38 and 46, respectively, and in engagement with the side walls of fixtures 42 and 50, respectively, and plate 28 is located between said jigs in engagement with the base of each of said fixtures. After plates 24, 26 and 28 have been operatively assembled, they are cemented together and when the cement sets or hardens, pins 36 which hold jigs 32 and 34 together are removed and said jigs are disassembled from the cemented unit comprising plates 24, 26 and 28. Thereafter plates 30 and 32 (Fig. 2) are cemented in operative position to this assembly to complete the mold.

While the mold and the mold assembling means have been described for the formation of a Porro prism arrangement, it is to be expressly understood that other complex prism means, such as an Abbé inverting prism system or a roof prism, may be cast in accordance with the present invention from organic resins or plastics of the character described.

There is thus provided novel mold means for forming complex prisms of the type adapted to invert and reverse left and right a beam of light whereby the desired shape, smoothness and surface accuracy are imparted to the prism means during the molding.

Since certain changes in the constructions set forth which embody the invention may be made without departing from its scope, it is intended that all matter contained in the above description, or shown in the accompanying drawing, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a mold for forming a plurality of integrally connected prisms, mold members cemented together to define a plurality of inter-connected prismatic mold cavities, opposite walls of one of said members providing the molding surfaces for defining a wall of each of two of said prisms.

2. A mold for a pair of integrally connected right-angle isosceles prisms comprising a pair of members having optically smooth molding surfaces for defining the isosceles sides of one of said prisms, a second pair of members having optically smooth molding surfaces for defining the isosceles sides of the other of said prisms, and a plate having a pair of parallel, optically smooth surfaces for defining the hypothenuse sides of both of said prisms, said members and said plate being rigidly secured together.

3. A mold for a pair of integrally connected triangular prisms comprising, in combination, a pair of plates for defining two sides of one of said prisms, a second pair of plates for defining two sides of the other of said prisms, and a single plate providing the molding surfaces for defining third sides of both of said prisms, and means for rigidly securing said plates together.

4. A mold for the formation of a Porro prism comprising a pair of right-angle isosceles prisms having portions of their hypotenuse faces integrally secured together by a connecting portion, said mold comprising a pair of members having optically smooth molding surfaces for defining the isosceles sides of one of said triangular prisms, a second pair of members having optically smooth molding surfaces for defining the isosceles sides of the other of said triangular prisms, and a plate having a pair of parallel, optically smooth surfaces, one of the latter surfaces defining a portion of the hypotenuse side of one of said triangular prisms and the other of said latter surfaces defining a portion of the hypotenuse side of the other of said triangular prisms, edge portions of said plate defining an aperture interconnecting the mold chamber formed by said first-named pair of members with the mold chamber formed by the second of said pair of mold members and for defining the portion of said Porro prism which interconnects said triangular prisms.

5. The mold of claim 4 wherein the mold members and the plate are formed of glass.

MURRY N. FAIRBANK.

REFERENCES CITED

The following references are of record in the file of this patent:

UNITED STATES PATENTS

| Number | Name | Date |
|---|---|---|
| 416,959 | Sheppard | Dec. 10, 1889 |
| 459,380 | Scott | Sept. 8, 1891 |
| 935,470 | Davis | Sept. 28, 1909 |
| 1,071,289 | Bader | Aug. 26, 1913 |
| 1,105,641 | Feaster | Aug. 4, 1914 |
| 1,142,956 | Greenberg | June 15, 1915 |
| 1,385,268 | Paulsen | July 19, 1921 |
| 1,485,061 | Ahlgren | Feb. 26, 1924 |
| 1,546,250 | Phillips | July 14, 1925 |
| 1,665,445 | Conrad | Apr. 10, 1928 |
| 1,897,023 | Schirmer | Feb. 7, 1933 |
| 1,940,323 | Rabezzana | Dec. 19, 1933 |
| 1,957,709 | Haynes | May 8, 1934 |
| 2,044,359 | Kuettel | June 16, 1936 |
| 2,072,273 | Obert | Mar. 2, 1937 |
| 2,079,393 | Benge | May 4, 1937 |
| 2,154,639 | Rohm et al. | Apr. 18, 1939 |
| 2,229,526 | Schabacker | Jan. 21, 1941 |
| 2,290,917 | Smith | July 28, 1942 |
| 2,305,945 | Williams et al. | Dec. 22, 1942 |
| 2,328,603 | Bennett et al. | Sept. 7, 1943 |